US012243260B2

United States Patent
Guizilini et al.

(10) Patent No.: US 12,243,260 B2
(45) Date of Patent: Mar. 4, 2025

(54) PRODUCING A DEPTH MAP FROM A MONOCULAR TWO-DIMENSIONAL IMAGE

(71) Applicant: Toyota Research Institute, Inc., Los Altos, CA (US)

(72) Inventors: Vitor Guizilini, Santa Clara, CA (US); Rares A. Ambrus, San Francisco, CA (US); Dian Chen, Mountain View, CA (US); Adrien David Gaidon, Mountain View, CA (US); Sergey Zakharov, San Francisco, CA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 389 days.

(21) Appl. No.: 17/879,307

(22) Filed: Aug. 2, 2022

(65) Prior Publication Data
US 2023/0154024 A1  May 18, 2023

Related U.S. Application Data

(60) Provisional application No. 63/279,823, filed on Nov. 16, 2021, provisional application No. 63/279,404, filed on Nov. 15, 2021.

(51) Int. Cl.
*G06T 7/73* (2017.01)
*G06T 7/55* (2017.01)
*G06T 7/593* (2017.01)

(52) U.S. Cl.
CPC .......... *G06T 7/73* (2017.01); *G06T 7/55* (2017.01); *G06T 7/593* (2017.01);
(Continued)

(58) Field of Classification Search
None
See application file for complete search history.

(56) References Cited

U.S. PATENT DOCUMENTS

| 11,176,709 B2 * | 11/2021 | Pillai | G01B 11/22 |
| 11,803,950 B2 * | 10/2023 | Li | G06N 3/04 |

(Continued)

FOREIGN PATENT DOCUMENTS

| CN | 109554559 A | 4/2019 |
| CN | 110120049 A | 8/2019 |

OTHER PUBLICATIONS

Wang et al. "Deep Visual Domain Adaptation: A Survey," Neurocomputing, vol. 312, No. 27, 2018, pp. 135-153.

(Continued)

*Primary Examiner* — Anand P Bhatnagar
(74) *Attorney, Agent, or Firm* — Christopher G. Darrow; Darrow Mustafa PC (57) ABSTRACT

A system for producing a depth map can include a processor and a memory. The memory can store a neural network. The neural network can include an encoding portion module, a multi-frame feature matching portion module, and a decoding portion module. The encoding portion module can include instructions that, when executed by the processor, cause the processor to encode an image to produce single-frame features. The multi-frame feature matching portion module can include instructions that, when executed by the processor, cause the processor to process the single-frame features to produce information. The decoding portion module can include instructions that, when executed by the processor, cause the processor to decode the information to produce the depth map. A first training dataset, used to train the multi-frame feature matching portion module, can be different from a second training dataset used to train the encoding portion module and the decoding portion module.

20 Claims, 6 Drawing Sheets

(52) U.S. Cl.
CPC .............. *G06T 2207/10012* (2013.01); *G06T 2207/10028* (2013.01); *G06T 2207/20076* (2013.01); *G06T 2207/20081* (2013.01); *G06T 2207/20084* (2013.01)

(56) References Cited

U.S. PATENT DOCUMENTS

| | | | |
|---|---|---|---|
| 11,948,309 B2* | 4/2024 | Guizilini | G06T 7/73 |
| 11,948,310 B2* | 4/2024 | Guizilini | G06T 7/579 |
| 2017/0337711 A1* | 11/2017 | Ratner | H04N 19/119 |
| 2018/0295375 A1* | 10/2018 | Ratner | G06T 7/12 |
| 2019/0347538 A1 | 11/2019 | Lee et al. | |
| 2020/0372660 A1 | 11/2020 | Li et al. | |
| 2021/0118184 A1* | 4/2021 | Pillai | G06N 3/088 |
| 2021/0150757 A1* | 5/2021 | Mustikovela | G06V 10/7784 |
| 2022/0383530 A1* | 12/2022 | Giryes | G03B 35/08 |
| 2022/0392083 A1* | 12/2022 | Guizilini | G06N 3/0442 |
| 2022/0392089 A1* | 12/2022 | Guizilini | G06N 3/0455 |
| 2024/0020710 A1* | 1/2024 | Ettl | G06N 20/00 |

OTHER PUBLICATIONS

Islam et al., "A new algorithm to design compact two-hidden-layer artificial neural networks," Neural Networks, vol. 14, No. 9, pp. 1265-1278, 2001.
Watson et al., "The Temporal Opportunist: Self-Supervised Multi-Frame Monocular Depth," 2021 IEEE/CVF Conference on Computer Vision and Pattern Recognition (CVPR), 2021, pp. 1164-1174.
Isikodogan et al., "SemifreddoNets: Partially Frozen Neural Networks for Efficient Computer Vision Systems," Retrieved from arxiv.org/abs/2006.06888.v1 [cs.CV] Jun. 12, 2020 pp. 1-16.
Zhao et al., "Monocular Depth Estimation Based on Deep Learning: An Overview," Sci. China Technol. Sci. No. 63, Mar. 14, 2020, pp. 1612-1627.
Evain et al., "A Lightweight Neural Network for Monocular View Generation with Occlusion Handling," IEEE Transactions on Pattern Analysis & Machine Intelligence, vol. 43, No. 6, Jul. 24, 2020, pp. 1832-1844.
Guizilini et al., "Geometric Unsupervised Domain Adaptation for Semantic Segmentation," Retrieved from arXiv:2103.16694v2 [cs.CV] Aug. 18, 2021, pp. 1-15.
Antequera et al., "Mapillary Planet-Scale Depth Dataset," In European Conference on Computer Vision, Aug. 23, 2020, pp. 589-604.
Huynh et al., "Guiding Monocular Depth Estimation Using Depth-Attention Volume," In ECCV, Aug. 23-28, 2020, pp. 1-17.
Sadek et al., "Self-Supervised Attention Learning for Depth and Ego-Motion Estimation," 2020 IEEE/RSJ International Conference on Intelligent Robots and Systems (IROS), Apr. 27, 2020, pp. 1-7.
Lee et al., "Patch-wise attention network for monocular depth estimation," Association for the Advancement of Artificial Intelligence Conference, Feb. 2021, pp. 1873-1881.
Ranftl et al., "Vision Transformers for Dense Prediction," Proceedings of the IEEE/CVF International Conference on Computer Vision (ICCV), Mar. 24, 2021, pp. 12179-12188.
Johnston et al., "Self-supervised Monocular Trained Depth Estimation using Self-attention and Discrete Disparity Volume," CVPR 2020, Computer Vision Foundation, pp. 4756-4765.
Li et al., "Revisiting Stereo Depth Estimation From a Sequence-to-Sequence Perspective with Transformers," Proceedings of the IEEE/CVF International Conference on Computer Vision (ICCV), Aug. 25, 2021, pp. 1-15.
Ruhkamp et al., "Attention meets Geometry: Geometry Guided Spatial-Temporal Attention for Consistent Self-Supervised Monocular Depth Estimation," 2021 International Conference on 3D Vision (3DV), Oct. 15, 2021, pp. 1-11.
Im et al., "DPSNet: End-to-end Deep Plane Sweep Stereo," Retrieved from: https://arXiv:1905.00538v1 [cs.CV] May 2, 2019, pp. 1-12.
Wu et al., "Semantic Stereo Matching with Pyramid Cost Volumes," 2019 IEEE/CVF International Conference on Computer Vision (ICCV), 2019, pp. 7484-7493.
Xu et al., "Structured Attention Guided Convolutional Neural Fields for Monocular Depth Estimation," 2018 IEEE/CVF Conference on Computer Vision and Pattern Recognition, Mar. 29, 2018, pp. 3917-3925.
Wimbauer et al., "MonoRec: Semi-Supervised Dense Reconstruction in Dynamic Environments from a Single Moving Camera," In CVPR, 2021, Computer Vision Foundation, pp. 6112-6122.
Unknown, "Bridging the Domain Gap for Neural Models," Computer vision, Jun. 2019, 9 pages.
Unknown, "Diversity? Accuracy? Important Properties of your Dataset," Jun. 20, 2020, 11 pages.
Unknown, "Domain adaptation," last accessed Jan. 10, 2022, 5 pages, found at https://en.wikipedia.org/wiki/Domain_adaptation.
Zhang et al., "Joint Geometrical and Statistical Alignment for Visual Domain Adaptation," Proceedings of the IEEE Conference on Computer Vision and Pattern Recognition (CVPR), 2017, pp. 1859-1867.
Nam et al., "Reducing Domain Gap by Reducing Style Bias," Proceedings of the IEEE/CVF Conference on Computer Vision and Pattern Recognition (CVPR), 2021, pp. 8690-8699.
Ram Sagar, "What Does Freezing A Layer Mean And How Does It Help In Fine Tuning Neural Networks," May 25, 2019, 18 pages.

* cited by examiner

PRODUCING A DEPTH MAP FROM A MONOCULAR TWO-DIMENSIONAL IMAGE

CROSS-REFERENCE TO RELATED APPLICATIONS

This application claims the benefit of U.S. Provisional Application No. 63/279,404, filed Nov. 15, 2021, and U.S. Provisional Application No. 63/279,823, filed Nov. 16, 2021, each of which is incorporated herein in its entirety by reference.

TECHNICAL FIELD

The disclosed technologies are directed to producing a depth map from a monocular two-dimensional image.

BACKGROUND

Computer vision tasks can be directed to deriving information from an image. The information can be used to produce a decision with respect to controlling a system supported by the computer vision tasks. For example, the system can be a mobile robot and the computer vision tasks can support navigation of the mobile robot. Often, computer vision tasks can involve detecting or extracting features from the image. Such features can include, for example, identifications of regions of interest, edges, corners, or the like. Computer vision tasks can include, for example, range imaging methods. Range imaging methods can be used to produce a two-dimensional image in which distances to points on objects in a scene, represented by the two-dimensional image, are incorporated into values of pixels that represent the points. Range imaging methods can include, for example, structure-from-motion. Structure-from-motion can be used, for example, to estimate three-dimensional structures from sequences of two-dimensional images. A viewpoint of a first image in a sequence can be different from a viewpoint of a second image in the sequence. Feature matching, between features produced from the first image and features produced from the second image, can be an important technique used to estimate the three-dimensional structures.

SUMMARY

In an embodiment, a system for producing a depth map can include a processor and a memory. The memory can store a neural network. The neural network can include an encoding portion module, a multi-frame feature matching portion module, and a decoding portion module. The encoding portion module can include instructions that, when executed by the processor, cause the processor to encode an image to produce single-frame features. The multi-frame feature matching portion module can include instructions that, when executed by the processor, cause the processor to process the single-frame features to produce information. The decoding portion module can include instructions that, when executed by the processor, cause the processor to decode the information to produce the depth map. A first training dataset, used to train the multi-frame feature matching portion module, can be different from a second training dataset used to train the encoding portion module and the decoding portion module.

In another embodiment, a method for producing a depth map can include encoding, by a processor operating an encoding portion of a neural network, an image to produce single-frame features. The method can include processing, by the processor operating a multi-frame feature matching portion of the neural network, the single-frame features to produce information. The method can include decoding, by the processor operating a decoding portion of the neural network, the information to produce the depth map. A first training dataset, used to train the multi-frame feature matching portion, can be different from a second training dataset used to train the encoding portion and the decoding portion.

In another embodiment, a non-transitory computer-readable medium for producing a depth map can include instructions that, when executed by one or more processors, cause the one or more processors to encode, operating an encoding portion of a neural network, an image to produce single-frame features. The non-transitory computer-readable medium can also include instructions that, when executed by one or more processors, cause the one or more processors to process, operating a multi-frame feature matching portion of the neural network, the single-frame features to produce information. The non-transitory computer-readable medium can also include instructions that, when executed by one or more processors, cause the one or more processors to decode, operating a decoding portion of the neural network, the information to produce the depth map. A first training dataset, used to train the multi-frame feature matching portion, can be different from a second training dataset used to train the encoding portion and the decoding portion.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

The disclosed technologies are directed to producing a depth map from a monocular two-dimensional image. An image can be encoded, by a processor operating an encoding portion of a neural network, to produce single-frame features. The single-frame features can be processed, by the processor operating a multi-frame feature matching portion of the neural network, to produce information. The information can be decoded, by the processor operating a decoding portion of the neural network, to produce the depth map. For example, the image can be of a scene that includes an object and the processor can determine, using the depth map, a distance to the object.

Calculating gradients for back-propagation to train such a neural network can require a substantial amount of memory, consume a substantial amount of time to perform operations by a processor, or both. This condition can cause a concern in a situation in which the neural network was trained using a training dataset associated with one domain (e.g., synthetic data, a first city, a first time of day (e.g., daytime), or the like), but is to be operated in an environment associated with another domain (e.g., real world data, a second city, a second time of day (e.g., nighttime), or the like). A gap between a representation of data in the one domain and a representation of data in the other domain, which can be referred to as a domain gap, can be a cause for this concern, which can be referred to as domain shift. Domain shift may require that the neural network be retrained using a training dataset associated with the other domain. For example, retraining a specific neural network, operating on eight graphical processing units, each of the graphical processing units having sixteen giga-bytes of memory, to produce a depth map from a monocular two-dimensional image can require fifty epochs to be completed. Such a retraining operation can consume fifty hours.

One tactic for reducing the amount of memory required, time consumed, or both to retrain the neural network can be to exclude a portion of the neural network from being retrained. That is, if the neural network, trained using a first training dataset but to be re-trained using a second training dataset, has a plurality of portions, one or more portions of the plurality of portions can be excluded from a retraining operation. For example, the one or more portions can be excluded from the retraining operation by performing the retraining operation in a manner that causes the weights associated with the one or more portions to remain unchanged. Performing the retraining operation in such a manner can be referred to as freezing the one or more portions.

However, having a neural network retrained by freezing one or more portions can cause a concern that a first degree of performance, a degree of performance of a neural network that has been retrained in this manner, may be less than a second degree of performance, a degree of performance of a neural network in which all portions of the neural network have been included in the retraining operation.

With respect to producing a depth map from a monocular two-dimensional image, the disclosed technologies can minimize a difference between the first degree of performance and the second degree of performance by freezing a portion of a neural network associated with a geometry-based task and retraining one or more portions of the neural network associated with an image-based task. Because a geometric domain gap (the domain gap associated with data produced by the geometry-based task operations) can be less than a visual domain gap (the domain gap associated with data produced by the image-based task operations), the difference between the first degree of performance and the second degree of performance can be minimized by this technique. For example, retraining, in this manner, the specific neural network described above to produce the depth map from the monocular two-dimensional image can require only ten epochs to be completed.

Figure 1:
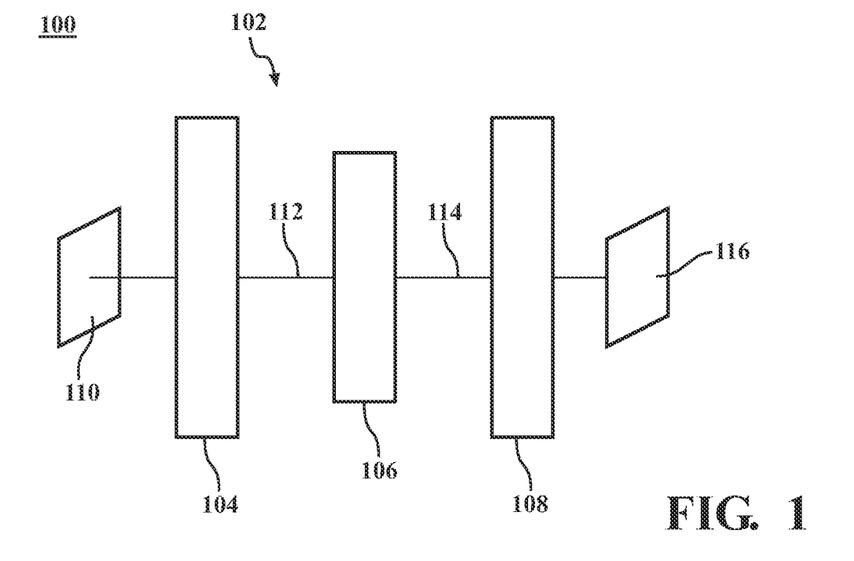
FIG. 1 includes a diagram of a first example of a neural network, according to the disclosed technologies.

FIG. 1 includes a diagram of a first example 100 of a neural network 102, according to the disclosed technologies. In the first example 100, the neural network 102 can include a first encoding portion 104, a multi-frame feature matching portion 106, and a decoding portion 108. An image 110 can be encoded, by the first encoding portion 104, to produce single-frame features 112. The single-frame features 112 can be processed, by the multi-frame feature matching portion 106, to produce information 114. The information 114 can be decoded, by the decoding portion 108, to produce a depth map 116.

Figure 2:
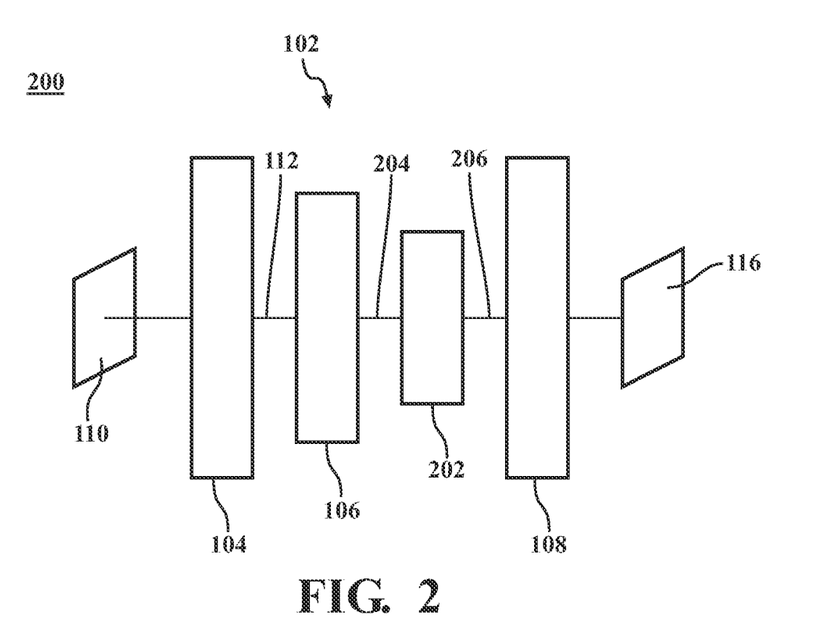
FIG. 2 includes a diagram of a second example of the neural network, according to the disclosed technologies.

FIG. 2 includes a diagram of a second example 200 of the neural network 102, according to the disclosed technologies. In the second example 200, the neural network 102 can include the first encoding portion 104, the multi-frame feature matching portion 106, a second encoding portion 202, and the decoding portion 108. The image 110 can be encoded, by the first encoding portion 104, to produce the single-frame features 112. The single-frame features 112 can be processed, by the multi-frame feature matching portion 106, to produce input information 204 (e.g., cost volume features). The input information 204 can be encoded, by the second encoding portion 202, to produce output information 206 (e.g., multi-frame features). The output information 206 can be decoded, by the decoding portion 108, to produce the depth map 116.

Figure 3:
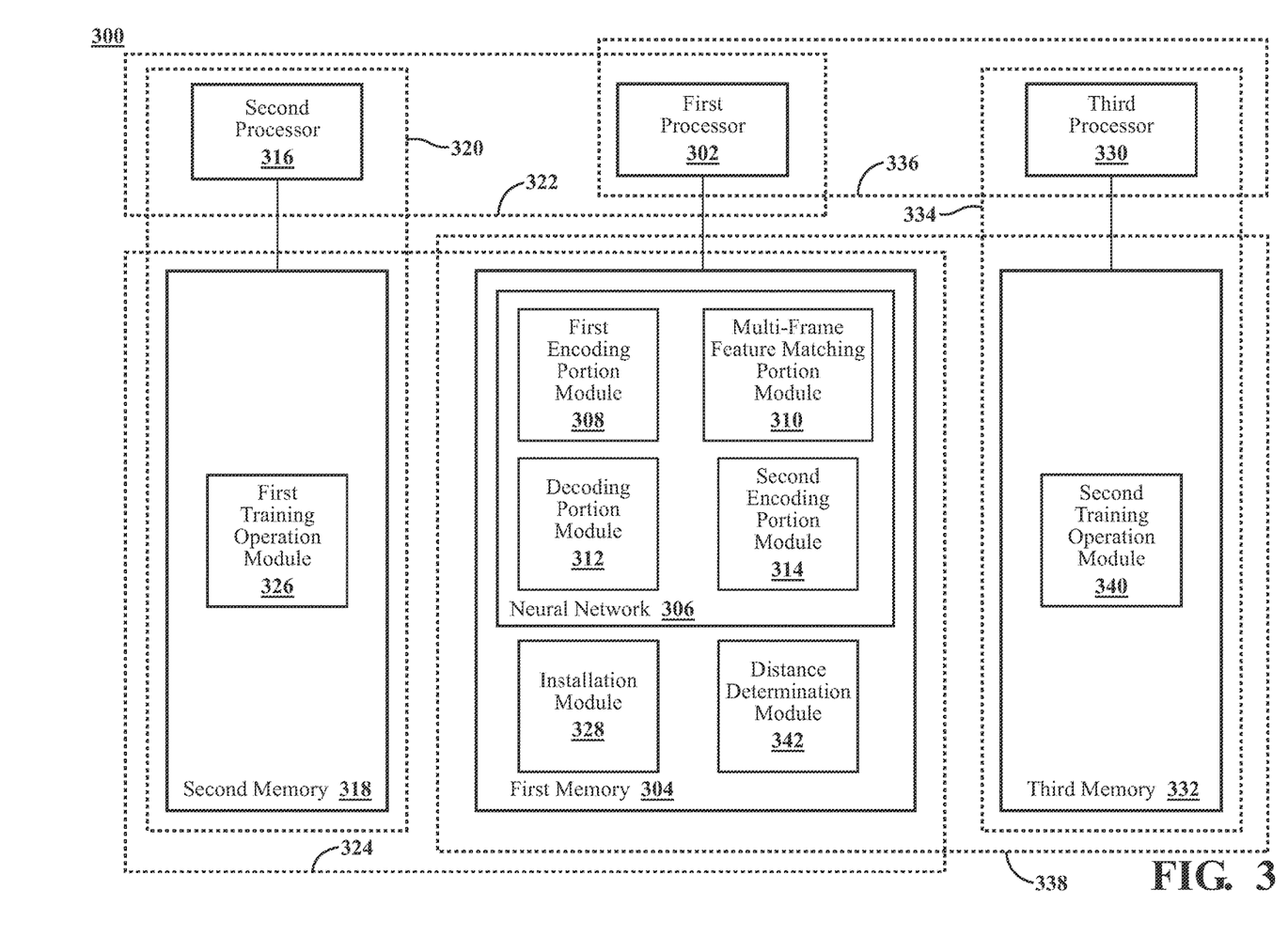
FIG. 3 includes a block diagram that illustrates an example of a system for producing a depth map, according to the disclosed technologies.

FIG. 3 includes a block diagram that illustrates an example of a system 300 for producing a depth map, according to the disclosed technologies. The system 300 can include, for example, a first processor 302 and a first memory 304. The first memory 304 can be communicably coupled to the first processor 302. The first memory 304 can store, for example, a neural network 306. The neural network 306 can include, for example, a first encoding portion module 308, a multi-frame feature matching portion module 310, and a decoding portion module 312. In a particular implementation, the system 300 can include a second encoding portion module 314. For example, the first processor 302 and the first memory 304 can be configured to be disposed on a mobile robot. For example, the mobile robot can include an automated vehicle.

For example, the first encoding portion module 308 can include instructions that function to control the first processor 302 to encode an image to produce single-frame features. For example, the image can be of a scene that includes an object. With reference to FIGS. 1 and 2, for example, the first encoding portion module 308 can be configured to perform operations associated with the first encoding portion 104, the image can be the image 110, and the single-frame features can be the single-frame features 112.

Returning to FIG. 3, for example, the multi-frame feature matching portion module 310 can include instructions that function to control the first processor 302 to process the single-frame features to produce information. With reference to FIG. 1, for example, the multi-frame feature matching portion module 310 can be configured to perform operations associated with the multi-frame feature matching portion 106 and the information can be the information 114.

Returning to FIG. 3, for example, the decoding portion module 312 can include instructions that function to control the first processor 302 to decode the information to produce the depth map. With reference to FIG. 1, for example, the decoding portion module 312 can be configured to perform operations associated with the decoding portion 108 and the information can be the depth map 116.

Returning to FIG. 3, for example, the depth map can include a set of depth maps. A scale of a first depth map, in the set of depth maps, can be different from a scale of a second depth map in the set of depth maps.

In the particular implementation, the information can include an input information and an output information. The instructions to process the single-frame features to produce the information can include instructions to process the single-frame features to produce the input information. The instructions to decode the information to produce the depth map can include instructions to decode the output information to produce the depth map. The second encoding portion module 314 can include instructions that function to control the first processor 302 to encode the input information to produce the output information. With reference to FIG. 2, for example, the second encoding portion module 314 can be configured to perform operations associated with the second encoding portion 202, the first information can be the first information 204 (e.g., cost volume features), and the second information can be the second information 206 (e.g., multi-frame features).

For example, a first training dataset, used to train the multi-frame feature matching portion module 310, can be different from a second training dataset used to train the first encoding portion module 308 and the decoding portion module 312 (and the second encoding portion module 314).

For example, the system 300 can further include a second processor 316 and a second memory 318. The second memory 318 can be communicably coupled to the second processor 316. For example, a first training system 320 can include the second processor 316 and the second memory 318. Additionally or alternatively, for example: (1) a combined processor 322 can include the first processor 302 and the second processor 316 and (2) a combined memory 324 can include the first memory 304 and the second memory 318. The second memory 318 can store, for example, a first training operation module 326. For example, the first training operation module 326 can include instructions that function to control the second processor 316 to cause a first geometry-based task training operation to be performed on the multi-frame feature matching portion module 310.

Figure 4:
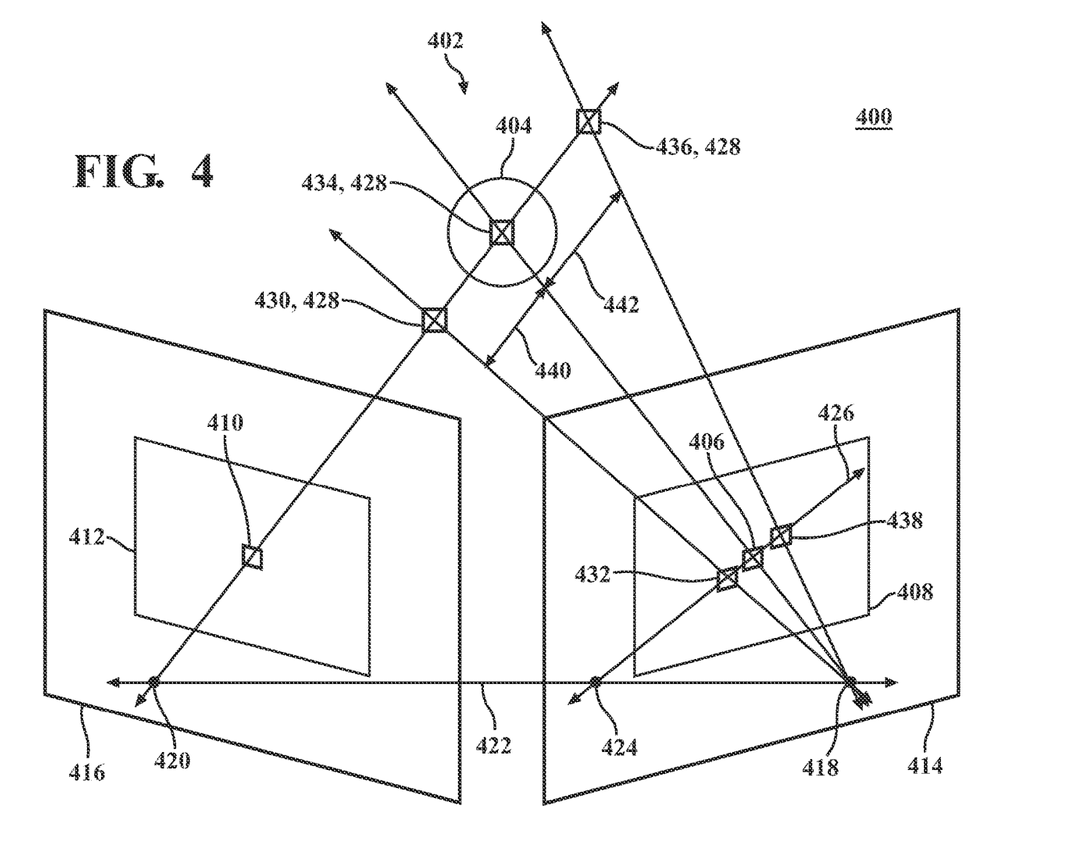
FIG. 4 includes a diagram of an example of a scene that is useful in illustrating training a multi-frame feature matching portion module with a training dataset, according to the disclosed technologies.

FIG. 4 includes a diagram 400 of an example of a scene 402 that is useful in illustrating training the multi-frame feature matching portion module 310 with the first training dataset, according to the disclosed technologies. For example, the scene 402 can include an object 404. For example, the diagram 400 can include a pixel 406 on the object 404 in a first training image 408, a corresponding pixel 410 on the object 404 in a second training image 412, a first plane 414 that includes the first training image 408, a second plane 416 that includes the second training image 412, a position 418 of a camera (not illustrated) at a production of the first training image 408, a position 420 of the camera (not illustrated) at a production of the second training image 412, a first line 422 that intersects the position 418 and the position 420, a position 424 that intersects the first plane 414 and the first line 422, and a second line 426 that intersects the position 424 and the pixel 406. The second line 426 can be an epipolar line. The epipolar line can be for the corresponding pixel 410. That is, in a situation in which: (1) an object in a scene is included in both a first training image and a second training image and (2) a viewpoint of the second training image is different from a viewpoint of the first training image, an epipolar line can define a relationship, with respect to the object, between the first training image and the second training image. The epipolar line can be disposed in a plane of one training image but can be for a position of the object in the other training image. The epipolar line can be used to determine a depth, in the scene, of the object in the other training image.

For example, the diagram 400 can further include a set of candidate depths 428 for pixels along the second line 426. For example, members of the set of candidate depths 428 can include a first member 430 (associated with a first pixel 432), a second member 434 (associated with the pixel 406), and a third member 436 (associated with a second pixel 438). For example, the set of candidate depths 428 can be defined by: (1) a range of candidate depths from a minimum candidate depth (associated with the first member 430) to a maximum candidate depth (associated with the third member 436) and (2) a count of members of the set of candidate depths 428 (i.e., three). For example, the third member 436 can be directly adjacent to the second member 434. For example, the second member 434 can be directly adjacent to the first member 430. A first distance 440 can be a distance between the first member 430 and the second member 434. A second distance 442 can be a distance between the second member 434 and the third member 436. For example, a relationship between the first distance 440 and the second distance 442 can be a logarithmic relationship. Such a relationship can be referred to as spatial-increasing discretization and can result in uniformly sampled depth values in a logarithmic space.

Figure 5:
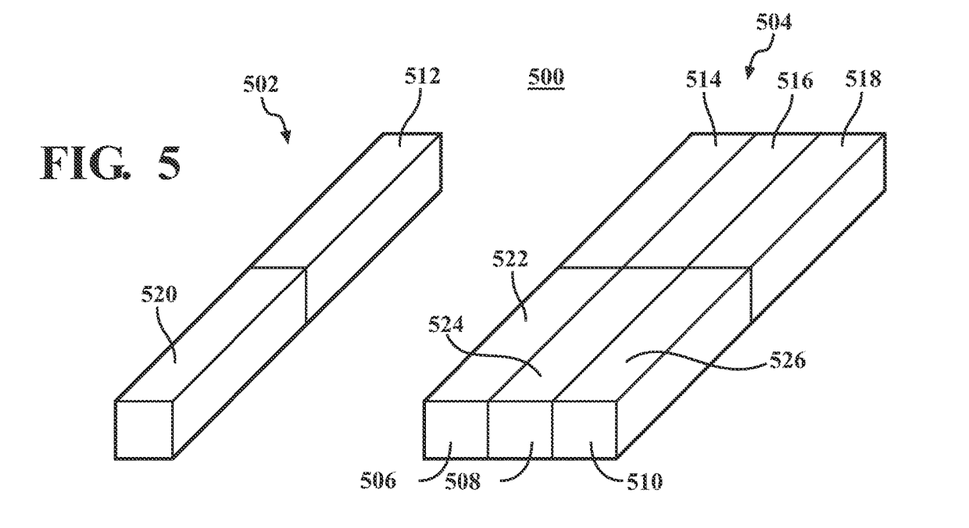
FIG. 5 includes a diagram that illustrates an example of a feature set, for a pixel in a second training image, and a set of feature sets for a set of candidate depths associated with a corresponding pixel in a first training image.

FIG. 5 includes a diagram 500 that illustrates an example of a feature set 502, for the corresponding pixel 410 in the second training image 412, and a set of feature sets 504 for the set of candidate depths 428 associated with the pixel 406 in the first training image 408. The set of feature sets 504 can include a first feature set 506 (associated with the first member 430 of the set of candidate depths 428), a second feature set 508 (associated with the second member 434 of the set of candidate depths 428), and a third feature set 510 (associated with the third member 436 of the set of candidate depths 428). For example, the feature set 502 can include a first feature 512, the first feature set 506 can include a corresponding first feature 514, the second feature set 508 can include a corresponding first feature 516, and the third feature set 510 can include a corresponding first feature 518. For example, the feature set 502 can include a second feature 520, the first feature set 506 can include a corresponding second feature 522, the second feature set 508 can include a corresponding second feature 524, and the third feature set 510 can include a corresponding second feature 526.

Returning to FIG. 3, for example, the multi-frame feature matching portion module 310 can include a cost volume of similarity measures between features of a first training image and features of a second training image. For example, the first training image can be a first frame in a sequence of frames and the second training image can be a second frame in the sequence of frames. For example, the second frame can be separated from the first frame by a duration of time. For example, a viewpoint of the first training image can be different from a viewpoint of the second training image.

In a computer vision task performed with a neural network, a cost volume of similarity measures can be results of operations to produce the similarity measures for pixels in an image feature set defined by: (1) a height measured by a count of the pixels, (2) a width measured by a count of the pixels, and (3) a count of the features associated with a pixel.

Because information associated with such results can be expressed in three dimensions, the results can be referred to as a cost volume.

With reference to FIG. 5, for example, in the disclosed technologies, the cost volume can be, for example, with respect to the set of feature sets 504 for the set of candidate depths 428. That is, the cost volume can include, for example, the results of the operations to produce the similarity measures associated with the first feature set 506, the second feature set 508, and the third feature set 510. For this reason, the cost volume of the disclosed technologies can be considered, for example, to have a fourth dimension (i.e., members of the set of feature sets 504).

Returning to FIG. 3, for example, for a pixel of the first training image, a similarity measure, of the similarity measures, can be determined using an attention technique. In a neural network, an attention technique can operate in a manner that mimics a way in which a human mind pays attention by one or more of enhancing an effect of a first portion of input information or diminishing an effect of a second portion of input information. In the neural network, the attention technique can be realized by a configuration that allows values of weights to be changed during an operation of the neural network.

For example, the similarity measure can be determined using a first attention technique. For example, the first attention technique can be a cross-attention technique. For example, the first attention technique can be performed with respect to features, associated with a corresponding pixel of the second training image, and features associated with a set of candidate depths determined from the first training image.

With reference to FIGS. 4 and 5, for example, the first attention technique can be performed with respect to features, associated with the corresponding pixel 410 of the second training image 412, and features associated with the set of candidate depths 428 determined from the first training image 408. For example, the first attention technique can be: (1) between the first feature 512 and: (a) the corresponding first feature 514, (b) the corresponding first feature 516, and (c) the corresponding first feature 518 and (2) between the second feature 520 and: (a) the corresponding second feature 522, (b) the corresponding second feature 524, and (c) the corresponding second feature 526.

Returning to FIG. 3, for example, the set of candidate depths can be associated with pixels, in the first training image, along an epipolar line associated with the corresponding pixel in the second training image. With reference to FIG. 4, for example, the set of candidate depths 428 can be associated with the first pixel 432, the pixel 406, and the second pixel 438, in the first training image 408, along the second line 426 (e.g., the epipolar line) associated with the corresponding pixel 410 in the second training image 412.

Returning to FIG. 3, for example, members of the set of candidate depths can include a first member, a second member, and a third member. For example, the third member can be directly adjacent to the second member. For example, the second member can be directly adjacent to the first member. A first distance can be a distance between the first member and the second member. A second distance can be a distance between the second member and the third member. For example, a relationship between the first distance and the second distance can be a logarithmic relationship. Such a relationship can be referred to as spatial-increasing discretization and can result in uniformly sampled depth values in a logarithmic space.

With reference to FIG. 4, for example, the members of the set of candidate depths 428 can include the first member 430, the second member 434, and the third member 436. For example, the third member 436 can be directly adjacent to the second member 434. For example, the second member 434 can be directly adjacent to the first member 430. The first distance 440 can be the distance between the first member 430 and the second member 434. The second distance 442 can be the distance between the second member 434 and the third member 436. For example, the relationship between the first distance 440 and the second distance 442 can be a logarithmic relationship.

Returning to FIG. 3, additionally, for example, the similarity measure can further be determined using a second attention technique. For example, the second attention technique can be a self-attention technique. For example, the second attention technique can be performed with respect to the features, associated with one member of the set of candidate depths, and the features associated with other members of the set of candidate depths.

With reference to FIGS. 4 and 5, for example, the second attention technique can be performed with respect to the features, associated with one member of the set of candidate depths 428, and the features associated with other members of the set of candidate depths 428. For example, the second attention technique can be performed between the corresponding first feature 514 and: (1) the corresponding first feature 516 and (2) the corresponding first feature 518.

Returning to FIG. 3, additionally, for example, the first memory 304 can further store an installation module 328. For example, the installation module 328 can include instructions that function to control the first processor 302 to cause, after a completion of the first geometry-based task training operation, the multi-frame feature matching portion module 310 to be included in the neural network 306.

For example, the system 300 can further include a third processor 330 and a third memory 332. The third memory 332 can be communicably coupled to the third processor 330. For example, a second training system 334 can include the third processor 330 and the third memory 332. Additionally or alternatively, for example: (1) a combined processor 336 can include the first processor 302 and the third processor 330 and (2) a combined memory 338 can include the first memory 304 and the third memory 332. The third memory 332 can store, for example, a second training operation module 340. For example, the second training operation module 340 can include instructions that function to control the third processor 330 to cause, using the second training dataset, an image-based task training operation to be performed on the first encoding portion module 308 and the decoding portion module 312 (and the second encoding portion module 314).

For example, the instructions to cause the image-based task training operation to be performed on the first encoding portion module 308 and the decoding portion module 312 (and the second encoding portion module 314) can include instructions to cause, after the multi-frame feature matching portion module 310 has been caused to be included in the neural network 306, the image-based task training operation to be performed on the first encoding portion module 308 and the decoding portion module 312 (and the second encoding portion module 314).

For example, the instructions to cause the image-based task training operation to be performed on the first encoding portion module 308 and the decoding portion module 312 (and the second encoding portion module 314) can include instructions to cause, in a manner that causes weights associated with the multi-frame feature matching portion module 310 to remain unchanged, the image-based task training operation to be performed on the first encoding portion module 308 and the decoding portion module 312 (and the second encoding portion module 314).

Additionally, for example, the second training operation module 340 can further include instructions that cause the third processor 330 to cause, using the second training dataset, a second geometry-based task training operation to be performed on the multi-frame feature matching portion module 310. For example, the second geometry-based task training operation can be performed concurrently with the image-based task training operation.

Additionally, for example, the first memory 304 can further store a distance determination module 342. For example, the distance determination module 342 can include instructions that function to control the first processor 302 to determine, using the depth map, a distance to the object in the scene.

Figure 6A:
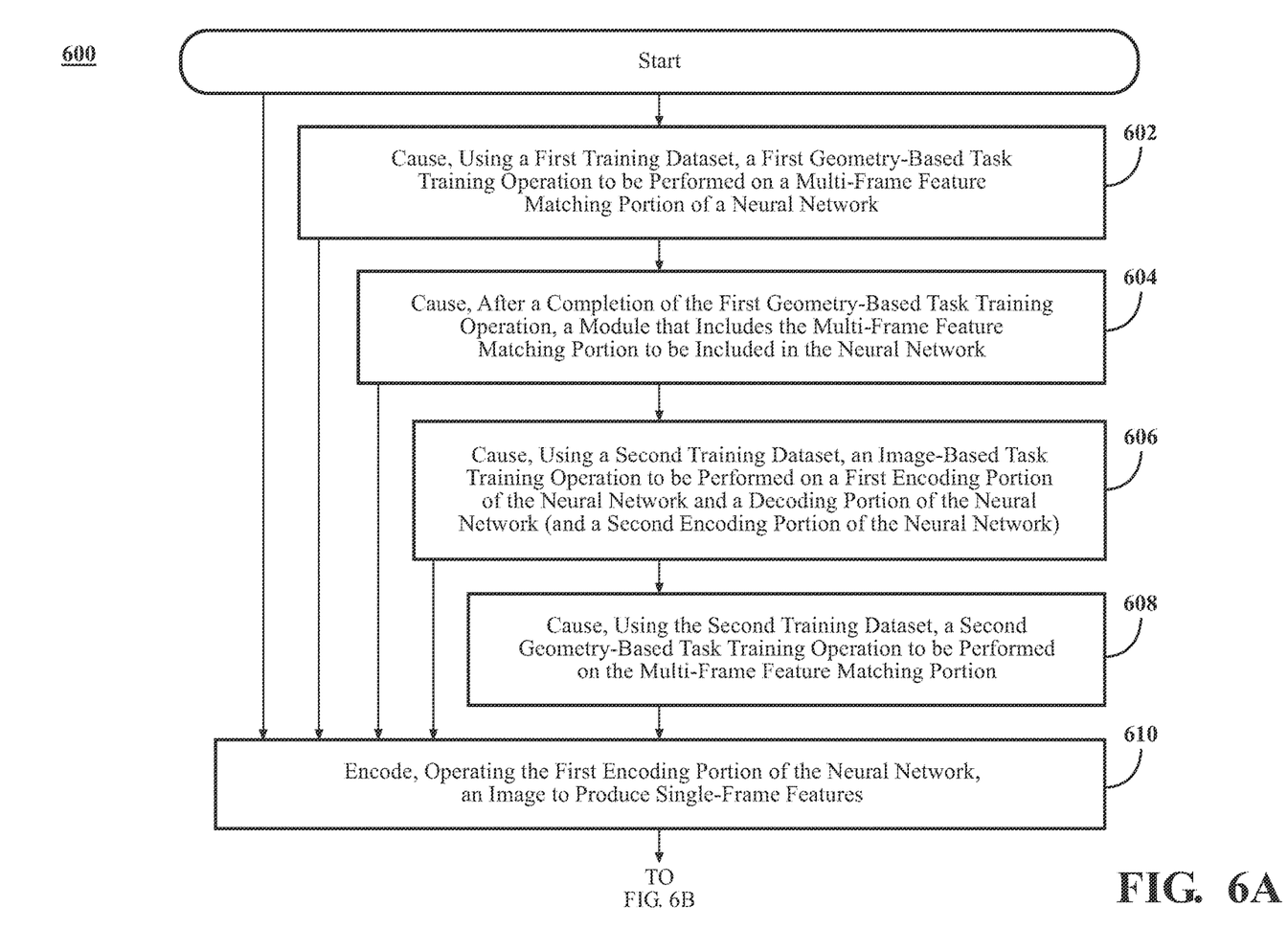
FIGS. 6A and 6B include a flow diagram that illustrates an example of a method that is associated with producing a depth map, according to the disclosed technologies.
Figure 6B:
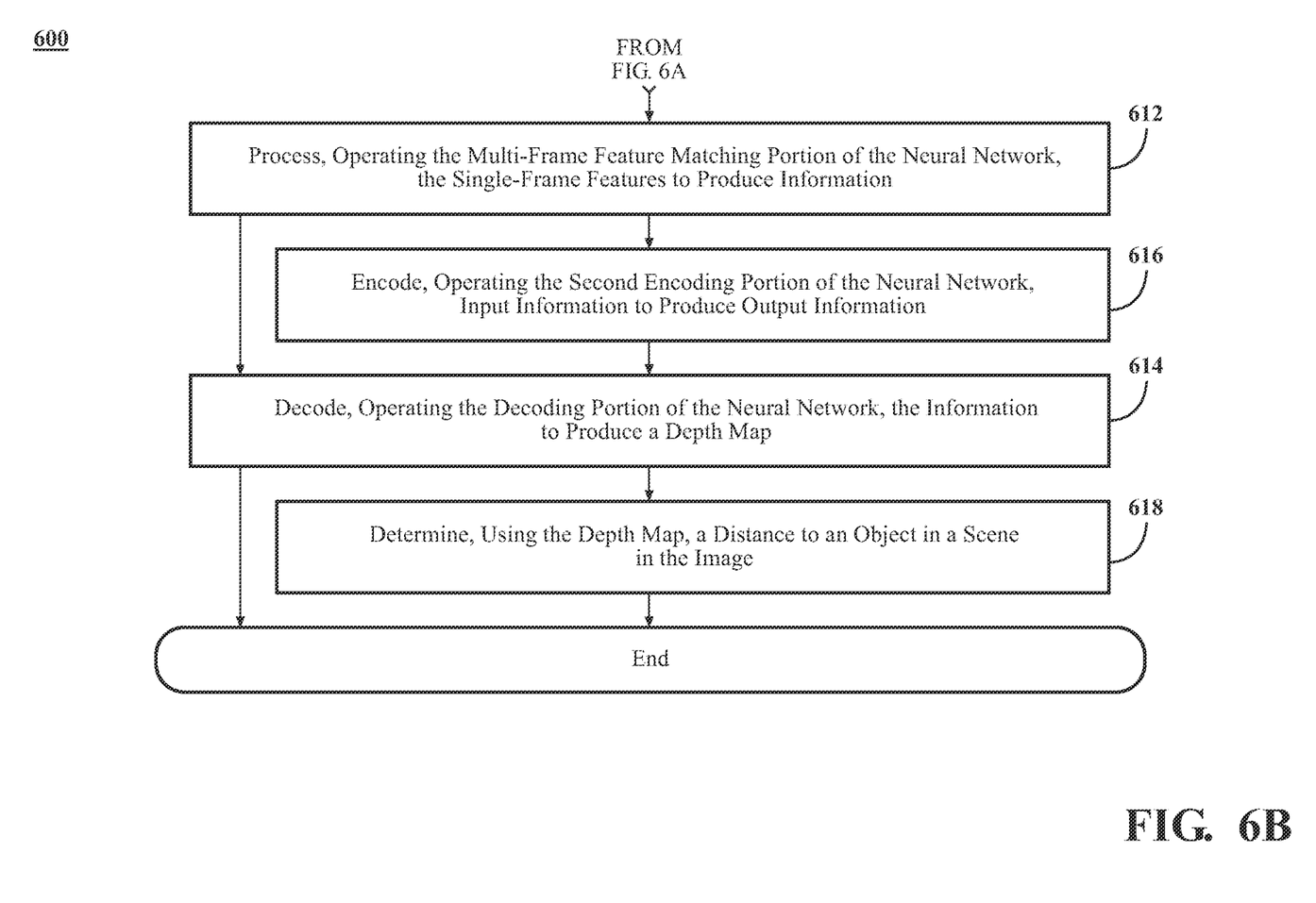

FIGS. 6A and 6B include a flow diagram that illustrates an example of a method 600 that is associated with producing a depth map, according to the disclosed technologies. Although the method 600 is described in combination with the system 300 illustrated in FIG. 3, one of skill in the art understands, in light of the description herein, that the method 600 is not limited to being implemented by the system 300 illustrated in FIG. 3. Rather, the system 300 illustrated in FIG. 3 is an example of a system that may be used to implement the method 600. Additionally, although the method 600 is illustrated as a generally serial process, various aspects of the method 600 may be able to be executed in parallel. For example, operations of the method 600 can be performed by a mobile robot. For example, the mobile robot can include an automated vehicle.

For example, a first training dataset, used to train a multi-frame feature matching portion of a neural network, can be different from a second training dataset used to train a first encoding portion of the neural network and a decoding portion of the neural network (and a second encoding portion of the neural network).

In FIG. 6A, in the method 600, at an operation 602, for example, the first training operation module 326 can cause, using the first training dataset, a first geometry-based task training operation to be performed on the multi-frame feature matching portion of the neural network.

For example, the multi-frame feature matching portion can include a cost volume of similarity measures between features of a first training image and features of a second training image. For example, the first training image can be a first frame in a sequence of frames and the second training image can be a second frame in the sequence of frames. For example, the second frame can be separated from the first frame by a duration of time. For example, a viewpoint of the first training image can be different from a viewpoint of the second training image.

For example, for a pixel of the first training image, a similarity measure, of the similarity measures, can be determined using an attention technique.

For example, the similarity measure can be determined using a first attention technique. For example, the first attention technique can be a cross-attention technique. For example, the first attention technique can be performed with respect to features, associated with a corresponding pixel of the second training image, and features associated with a set of candidate depths determined from the first training image.

For example, the set of candidate depths can be associated with pixels, in the first training image, along an epipolar line associated with the corresponding pixel in the second training image.

For example, members of the set of candidate depths can include a first member, a second member, and a third member. For example, the third member can be directly adjacent to the second member. For example, the second member can be directly adjacent to the first member. A first distance can be a distance between the first member and the second member. A second distance can be a distance between the second member and the third member. For example, a relationship between the first distance and the second distance can be a logarithmic relationship.

Additionally, for example, the similarity measure can further be determined using a second attention technique. For example, the second attention technique can be a self-attention technique. For example, the second attention technique can be performed with respect to the features, associated with one member of the set of candidate depths, and the features associated with other members of the set of candidate depths.

At an operation 604, for example, the installation module 328 can cause, after a completion of the first geometry-based task training operation, a module that includes the multi-frame feature matching portion to be included in the neural network.

For example, the combined processor 322 can include the first processor 302 and the second processor 316.

At an operation 606, for example, the second training operation module 340 can cause, using the second training dataset, an image-based task training operation to be performed on the first encoding portion of the neural network and a decoding portion of the neural network (and the second encoding portion of the neural network).

For example, the combined processor 336 can include the first processor 302 and the third processor 330.

For example, the operation 606 can be performed after the operation 604.

For example, the operation 606 can be performed in a manner that causes weights associated with the multi-frame feature matching portion to remain unchanged.

At an operation 608, for example, the second training operation module 340 can cause, using the second training dataset, a second geometry-based task training operation to be performed on the multi-frame feature matching portion.

For example, the operation 608 can be performed concurrently with the operation 606.

At an operation 610, for example, the first encoding portion module 308 can encode, operating the first encoding portion of the neural network, an image to produce single-frame features. For example, the image can be of a scene that includes an object.

In FIG. 6B, in the method 600, at an operation 612, for example, the multi-frame feature matching portion module 310 can process, operating the multi-frame feature matching portion of the neural network, the single-frame features to produce information.

At an operation 614, for example, the decoding portion module 312 can decode, operating the decoding portion of the neural network, the information to produce the depth map.

For example, the depth map can include a set of depth maps. A scale of a first depth map, in the set of depth maps, can be different from a scale of a second depth map in the set of depth maps.

In a particular implementation, the information can include an input information and an output information. The operation 612 can process the single-frame features to produce the input information. The operation 614 can decode the output information to produce the depth map. At an operation 616, for example, the second encoding portion module 314 can encode, operating the second encoding portion of the neural network, the input information to produce the output information.

At an operation 618, for example, the distance determination module 342 can determine, using the depth map, a distance to the object in the scene.

Figure 7:
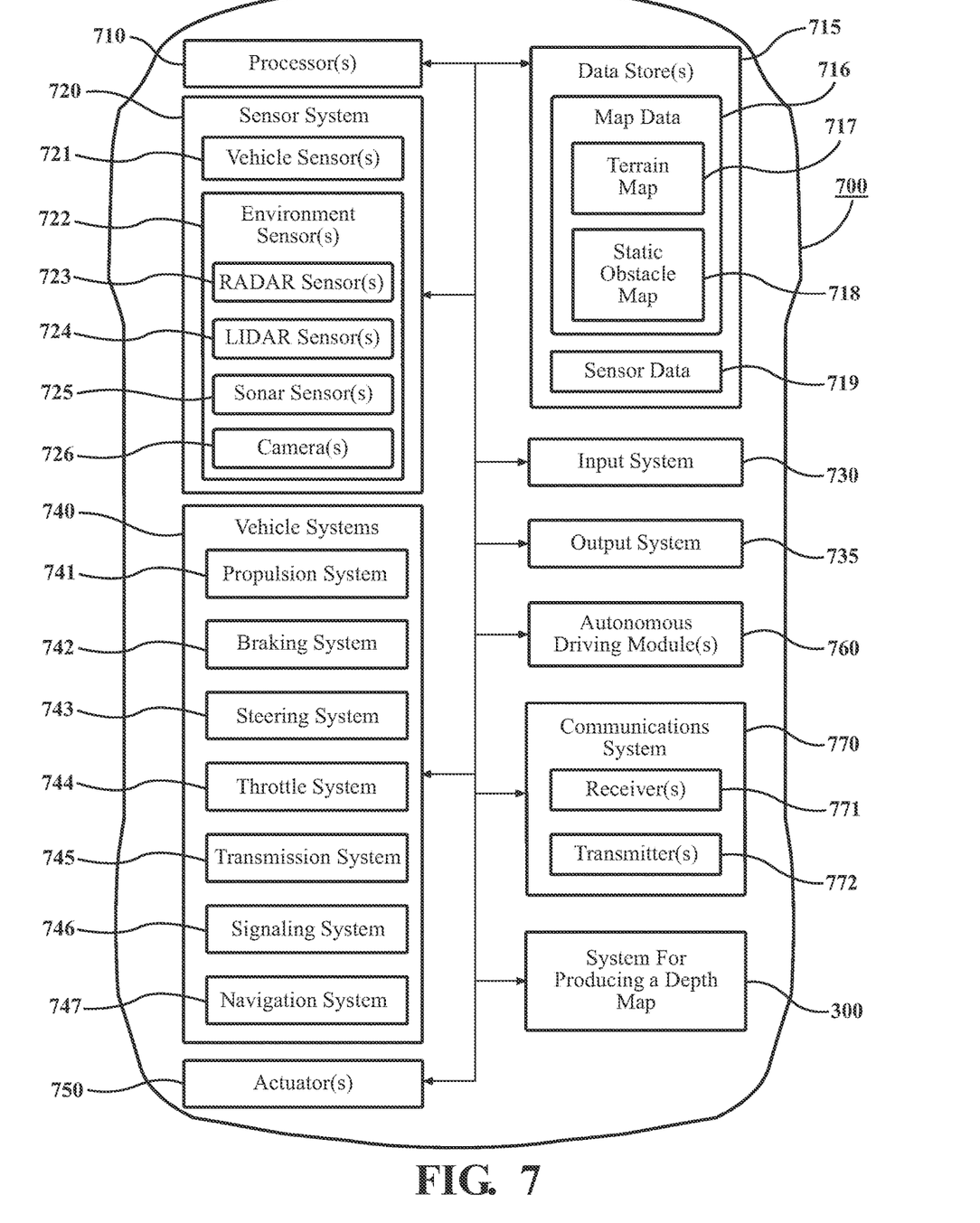
FIG. 7 includes a block diagram that illustrates an example of elements disposed on a vehicle, according to the disclosed technologies.

FIG. 7 includes a block diagram that illustrates an example of elements disposed on a vehicle 700, according to the disclosed technologies. As used herein, a "vehicle" can be any form of powered transport. In one or more implementations, the vehicle 700 can be an automobile. While arrangements described herein are with respect to automobiles, one of skill in the art understands, in light of the description herein, that embodiments are not limited to automobiles.

In some embodiments, the vehicle 700 can be configured to switch selectively between an automated mode, one or more semi-automated operational modes, and/or a manual mode. Such switching can be implemented in a suitable manner, now known or later developed. As used herein, "manual mode" can refer that all of or a majority of the navigation and/or maneuvering of the vehicle 700 is performed according to inputs received from a user (e.g., human driver). In one or more arrangements, the vehicle 700 can be a conventional vehicle that is configured to operate in only a manual mode.

In one or more embodiments, the vehicle 700 can be an automated vehicle. As used herein, "automated vehicle" can refer to a vehicle that operates in an automated mode. As used herein, "automated mode" can refer to navigating and/or maneuvering the vehicle 700 along a travel route using one or more computing systems to control the vehicle 700 with minimal or no input from a human driver. In one or more embodiments, the vehicle 700 can be highly automated or completely automated. In one embodiment, the vehicle 700 can be configured with one or more semi-automated operational modes in which one or more computing systems perform a portion of the navigation and/or maneuvering of the vehicle along a travel route, and a vehicle operator (i.e., driver) provides inputs to the vehicle 700 to perform a portion of the navigation and/or maneuvering of the vehicle 700 along a travel route.

For example, Standard J3016, Taxonomy and Definitions for Terms Related to Driving Automation Systems for On-Road Motor Vehicles, issued by the Society of Automotive Engineers (SAE) International on Jan. 16, 2014, and most recently revised on Jun. 15, 2018, defines six levels of driving automation. These six levels include: (1) level 0, no automation, in which all aspects of dynamic driving tasks are performed by a human driver; (2) level 1, driver assistance, in which a driver assistance system, if selected, can execute, using information about the driving environment, either steering or acceleration/deceleration tasks, but all remaining driving dynamic tasks are performed by a human driver; (3) level 2, partial automation, in which one or more driver assistance systems, if selected, can execute, using information about the driving environment, both steering and acceleration/deceleration tasks, but all remaining driving dynamic tasks are performed by a human driver; (4) level 3, conditional automation, in which an automated driving system, if selected, can execute all aspects of dynamic driving tasks with an expectation that a human driver will respond appropriately to a request to intervene; (5) level 4, high automation, in which an automated driving system, if selected, can execute all aspects of dynamic driving tasks even if a human driver does not respond appropriately to a request to intervene; and (6) level 5, full automation, in which an automated driving system can execute all aspects of dynamic driving tasks under all roadway and environmental conditions that can be managed by a human driver.

The vehicle 700 can include various elements. The vehicle 700 can have any combination of the various elements illustrated in FIG. 7. In various embodiments, it may not be necessary for the vehicle 700 to include all of the elements illustrated in FIG. 7. Furthermore, the vehicle 700 can have elements in addition to those illustrated in FIG. 7. While the various elements are illustrated in FIG. 7 as being located within the vehicle 700, one or more of these elements can be located external to the vehicle 700. Furthermore, the elements illustrated may be physically separated by large distances. For example, as described, one or more components of the disclosed system can be implemented within the vehicle 700 while other components of the system can be implemented within a cloud-computing environment, as described below. For example, the elements can include one or more processors 710, one or more data stores 715, a sensor system 720, an input system 730, an output system 735, vehicle systems 740, one or more actuators 750, one or more automated driving modules 760, a communications system 770, and the system 300 for producing a depth map.

In one or more arrangements, the one or more processors 710 can be a main processor of the vehicle 700. For example, the one or more processors 710 can be an electronic control unit (ECU). For example, functions and/or operations of the processor 302, the processor 322, or the processor 336 (illustrated in FIG. 3) can be realized by the one or more processors 710.

The one or more data stores 715 can store, for example, one or more types of data. The one or more data stores 715 can include volatile memory and/or non-volatile memory. For example, functions and/or operations of the memory 304, the memory 324, or the memory 338 (illustrated in FIG. 3) can be realized by the one or more data stores 715. Examples of suitable memory for the one or more data stores 715 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 715 can be a component of the one or more processors 710. Additionally or alternatively, the one or more data stores 715 can be operatively connected to the one or more processors 710 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 715 can store map data 716. The map data 716 can include maps of one or more geographic areas. In some instances, the map data 716 can include information or data on roads, traffic control devices, road markings, structures, features, and/or landmarks in the one or more geographic areas. The map data 716 can be in any suitable form. In some instances, the map data 716 can include aerial views of an area. In some instances, the map data 716 can include ground views of an area, including 360-degree ground views. The map data 716 can include measurements, dimensions, distances, and/or information for one or more items included in the map data 716 and/or relative to other items included in the map data 716. The map data 716 can include a digital map with information about road geometry. The map data 716 can be high quality and/or highly detailed.

In one or more arrangements, the map data 716 can include one or more terrain maps 717. The one or more terrain maps 717 can include information about the ground, terrain, roads, surfaces, and/or other features of one or more geographic areas. The one or more terrain maps 717 can include elevation data of the one or more geographic areas. The map data 716 can be high quality and/or highly detailed. The one or more terrain maps 717 can define one or more ground surfaces, which can include paved roads, unpaved roads, land, and other things that define a ground surface.

In one or more arrangements, the map data 716 can include one or more static obstacle maps 718. The one or more static obstacle maps 718 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 718 can have location data, size data, dimension data, material data, and/or other data associated with them. The one or more static obstacle maps 718 can include measurements, dimensions, distances, and/or information for one or more static obstacles. The one or more static obstacle maps 718 can be high quality and/or highly detailed. The one or more static obstacle maps 718 can be updated to reflect changes within a mapped area.

In one or more arrangements, the one or more data stores 715 can store sensor data 719. As used herein, "sensor data" can refer to any information about the sensors with which the vehicle 700 can be equipped including the capabilities of and other information about such sensors. The sensor data 719 can relate to one or more sensors of the sensor system 720. For example, in one or more arrangements, the sensor data 719 can include information about one or more lidar sensors 724 of the sensor system 720.

In some arrangements, at least a portion of the map data 716 and/or the sensor data 719 can be located in one or more data stores 715 that are located onboard the vehicle 700. Alternatively or additionally, at least a portion of the map data 716 and/or the sensor data 719 can be located in one or more data stores 715 that are located remotely from the vehicle 700.

The sensor system 720 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 720 includes a plurality of sensors, the sensors can work independently from each other. Alternatively, two or more of the sensors can work in combination with each other. In such a case, the two or more sensors can form a sensor network. The sensor system 720 and/or the one or more sensors can be operatively connected to the one or more processors 710, the one or more data stores 715, and/or another element of the vehicle 700 (including any of the elements illustrated in FIG. 7). The sensor system 720 can acquire data of at least a portion of the external environment of the vehicle 700 (e.g., nearby vehicles). The sensor system 720 can include any suitable type of sensor. Various examples of different types of sensors are described herein. However, one of skill in the art understands that the embodiments are not limited to the particular sensors described herein.

The sensor system 720 can include one or more vehicle sensors 721. The one or more vehicle sensors 721 can detect, determine, and/or sense information about the vehicle 700 itself. In one or more arrangements, the one or more vehicle sensors 721 can be configured to detect and/or sense position and orientation changes of the vehicle 700 such as, for example, based on inertial acceleration. In one or more arrangements, the one or more vehicle sensors 721 can include one or more accelerometers, one or more gyroscopes, an inertial measurement unit (IMU), a dead-reckoning system, a global navigation satellite system (GNSS), a global positioning system (GPS), a navigation system 747, and/or other suitable sensors. The one or more vehicle sensors 721 can be configured to detect and/or sense one or more characteristics of the vehicle 700. In one or more arrangements, the one or more vehicle sensors 721 can include a speedometer to determine a current speed of the vehicle 700.

Alternatively or additionally, the sensor system 720 can include one or more environment sensors 722 configured to acquire and/or sense driving environment data. As used herein, "driving environment data" can include data or information about the external environment in which a vehicle is located or one or more portions thereof. For example, the one or more environment sensors 722 can be configured to detect, quantify, and/or sense obstacles in at least a portion of the external environment of the vehicle 700 and/or information/data about such obstacles. Such obstacles may be stationary objects and/or dynamic objects. The one or more environment sensors 722 can be configured to detect, measure, quantify, and/or sense other things in the external environment of the vehicle 700 such as, for example, lane markers, signs, traffic lights, traffic signs, lane lines, crosswalks, curbs proximate the vehicle 700, off-road objects, etc.

Various examples of sensors of the sensor system 720 are described herein. The example sensors may be part of the one or more vehicle sensors 721 and/or the one or more environment sensors 722. However, one of skill in the art understands that the embodiments are not limited to the particular sensors described.

In one or more arrangements, the one or more environment sensors 722 can include one or more radar sensors 723, one or more lidar sensors 724, one or more sonar sensors 725, and/or one more cameras 726. In one or more arrangements, the one or more cameras 726 can be one or more high dynamic range (HDR) cameras or one or more infrared (IR) cameras. For example, the one or more cameras 726 can be used to record a reality of a state of an item of information that can appear in the digital map.

The input system 730 can include any device, component, system, element, arrangement, or groups thereof that enable information/data to be entered into a machine. The input system 730 can receive an input from a vehicle passenger (e.g., a driver or a passenger). The output system 735 can include any device, component, system, element, arrangement, or groups thereof that enable information/data to be presented to a vehicle passenger (e.g., a driver or a passenger).

Various examples of the one or more vehicle systems 740 are illustrated in FIG. 7. However, one of skill in the art understands that the vehicle 700 can include more, fewer, or different vehicle systems. Although particular vehicle systems can be separately defined, each or any of the systems or portions thereof may be otherwise combined or segregated via hardware and/or software within the vehicle 700. For example, the one or more vehicle systems 740 can include a propulsion system 741, a braking system 742, a steering system 743, a throttle system 744, a transmission system 745, a signaling system 746, and/or the navigation system 747. Each of these systems can include one or more devices, components, and/or a combination thereof, now known or later developed.

The navigation system 747 can include one or more devices, applications, and/or combinations thereof, now known or later developed, configured to determine the geographic location of the vehicle 700 and/or to determine a travel route for the vehicle 700. The navigation system 747 can include one or more mapping applications to determine a travel route for the vehicle 700. The navigation system 747 can include a global positioning system, a local positioning system, a geolocation system, and/or a combination thereof.

The one or more actuators 750 can be any element or combination of elements operable to modify, adjust, and/or alter one or more of the vehicle systems 740 or components thereof responsive to receiving signals or other inputs from the one or more processors 710 and/or the one or more automated driving modules 760. Any suitable actuator can be used. For example, the one or more actuators 750 can include motors, pneumatic actuators, hydraulic pistons, relays, solenoids, and/or piezoelectric actuators.

The one or more processors 710 and/or the one or more automated driving modules 760 can be operatively connected to communicate with the various vehicle systems 740 and/or individual components thereof. For example, the one or more processors 710 and/or the one or more automated driving modules 760 can be in communication to send and/or receive information from the various vehicle systems 740 to control the movement, speed, maneuvering, heading, direction, etc. of the vehicle 700. The one or more processors 710 and/or the one or more automated driving modules 760 may control some or all of these vehicle systems 740 and, thus, may be partially or fully automated.

The one or more processors 710 and/or the one or more automated driving modules 760 may be operable to control the navigation and/or maneuvering of the vehicle 700 by controlling one or more of the vehicle systems 740 and/or components thereof. For example, when operating in an automated mode, the one or more processors 710 and/or the one or more automated driving modules 760 can control the direction and/or speed of the vehicle 700. The one or more processors 710 and/or the one or more automated driving modules 760 can cause the vehicle 700 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner. The communications system 770 can include one or more receivers 771 and/or one or more transmitters 772. The communications system 770 can receive and transmit one or more messages through one or more wireless communications channels. For example, the one or more wireless communications channels can be in accordance with the Institute of Electrical and Electronics Engineers (IEEE) 802.11p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. For example, the communications system 770 can include "connected vehicle" technology. "Connected vehicle" technology can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies.

Moreover, the one or more processors 710, the one or more data stores 715, and the communications system 770 can be configured to one or more of form a micro cloud, participate as a member of a micro cloud, or perform a function of a leader of a mobile micro cloud. A micro cloud can be characterized by a distribution, among members of the micro cloud, of one or more of one or more computing resources or one or more data storage resources in order to collaborate on executing operations. The members can include at least connected vehicles.

The vehicle 700 can include one or more modules, at least some of which are described herein. The modules can be implemented as computer-readable program code that, when executed by the one or more processors 710, implement one or more of the various processes described herein. One or more of the modules can be a component of the one or more processors 710. Alternatively or additionally, one or more of the modules can be executed on and/or distributed among other processing systems to which the one or more processors 710 can be operatively connected. The modules can include instructions (e.g., program logic) executable by the one or more processors 710. Alternatively or additionally, the one or more data store 715 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 700 can include one or more automated driving modules 760. The one or more automated driving modules 760 can be configured to receive data from the sensor system 720 and/or any other type of system capable of capturing information relating to the vehicle 700 and/or the external environment of the vehicle 700. In one or more arrangements, the one or more automated driving modules 760 can use such data to generate one or more driving scene models. The one or more automated driving modules 760 can determine position and velocity of the vehicle 700. The one or more automated driving modules 760 can determine the location of obstacles, obstacles, or other environmental features including traffic signs, trees, shrubs, neighboring vehicles, pedestrians, etc.

The one or more automated driving modules 760 can be configured to receive and/or determine location information for obstacles within the external environment of the vehicle 700 for use by the one or more processors 710 and/or one or more of the modules described herein to estimate position and orientation of the vehicle 700, vehicle position in global coordinates based on signals from a plurality of satellites, or any other data and/or signals that could be used to determine the current state of the vehicle 700 or determine the position of the vehicle 700 with respect to its environment for use in either creating a map or determining the position of the vehicle 700 in respect to map data.

The one or more automated driving modules 760 can be configured to determine one or more travel paths, current automated driving maneuvers for the vehicle 700, future automated driving maneuvers and/or modifications to current automated driving maneuvers based on data acquired by the sensor system 720, driving scene models, and/or data from any other suitable source such as determinations from the sensor data 719. As used herein, "driving maneuver" can refer to one or more actions that affect the movement of a vehicle. Examples of driving maneuvers include: accelerating, decelerating, braking, turning, moving in a lateral direction of the vehicle 700, changing travel lanes, merging into a travel lane, and/or reversing, just to name a few possibilities. The one or more automated driving modules 760 can be configured to implement determined driving maneuvers. The one or more automated driving modules 760 can cause, directly or indirectly, such automated driving maneuvers to be implemented. As used herein, "cause" or "causing" means to make, command, instruct, and/or enable an event or action to occur or at least be in a state where such event or action may occur, either in a direct or indirect manner. The one or more automated driving modules 760 can be configured to execute various vehicle functions and/or to transmit data to, receive data from, interact with, and/or control the vehicle 700 or one or more systems thereof (e.g., one or more of vehicle systems 740). For example, functions and/or operations of an automotive navigation system can be realized by the one or more automated driving modules 760.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1-5, 6A, 6B, and 7, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
a first processor; and
a first memory storing:
  a neural network, the neural network including:
    a first encoding portion module including instructions that, when executed by the first processor, cause the first processor to encode an image to produce single-frame features;
    a multi-frame feature matching portion module including instructions that, when executed by the first processor, cause the first processor to process the single-frame features to produce information; and
    a decoding portion module including instructions that, when executed by the first processor, cause the first processor to decode the information to produce a depth map, wherein a first training dataset, used to train the multi-frame feature matching portion module, is different from a second training dataset used to train the encoding portion module and the decoding portion module.

2. The system of claim 1, wherein:
the image is of a scene that includes an object, and
the first memory further stores a distance determination module including instructions that, when executed by the first processor, cause the first processor to determine, using the depth map, a distance to the object.

3. The system of claim 1, wherein:
the information comprises an input information and an output information,
the instructions to process the single-frame features to produce the information include instructions to process the single-frame features to produce the input information,
the instructions to decode the information to produce the depth map include instructions to decode the output information to produce the depth map, and
the neural network further includes a second encoding portion module including instructions that, when executed by the first processor, cause the first processor to encode the input information to produce the output information.

4. The system of claim 1, wherein the multi-frame feature matching portion module includes a cost volume of similarity measures between features of a first training image and features of a second training image, the first training image being a first frame in a sequence of frames, and the second training image being a second frame in the sequence of frames.

5. The system of claim 4, wherein for a pixel of the first training image, a similarity measure, of the similarity measures, is determined using a first attention technique with respect to features, associated with a corresponding pixel of the second training image, and features associated with a set of candidate depths determined from the first training image.

6. The system of claim 5, wherein the set of candidate depths is associated with pixels, in the first training image, along an epipolar line associated with the corresponding pixel in the second training image.

7. The system of claim 6, wherein:
members of the set of candidate depths include a first member, a second member, and a third member, the third member being directly adjacent to the second member, and the second member being directly adjacent to the first member, and
a relationship between a first distance and a second distance is a logarithmic relationship, a first distance being a distance between the first member and the second member, the second distance being a distance between the second member and the third member.

8. The system of claim 5, wherein for the pixel of the first training image, the similarity measure, of the similarity measures, is further determined using a second attention technique with respect to the features, associated with one member of the set of candidate depths, and the features associated with other members of the set of candidate depths.

9. The system of claim 1, further comprising:
a second processor; and
a second memory storing a first training operation module including instructions that, when executed by the second processor, cause the second processor to cause a first geometry-based task training operation to be performed on the multi-frame feature matching portion module.

10. The system of claim 9, wherein:
the second processor is the first processor; and
the second memory is the first memory.

11. The system of claim 9, wherein the first memory further stores an installation module including instructions that, when executed by the first processor, cause the first processor to cause, after a completion of the first geometry-based task training operation, the multi-frame feature matching portion module to be included in the neural network.

12. The system of claim 11, further comprising:
a third processor; and
a third memory storing a second training operation module including instructions that, when executed by the third processor, cause the third processor to cause, using the second training dataset, an image-based task training operation to be performed on the first encoding portion module and the decoding portion module.

13. The system of claim 12, wherein:
the third processor is the first processor; and
the third memory is the first memory.

14. The system of claim 12, wherein the instructions to cause the image-based task training operation to be performed on the first encoding portion module and the decoding portion module include instructions to cause, after the multi-frame feature matching portion module has been caused to be included in the neural network, the image-based task training operation to be performed on the first encoding portion module and the decoding portion module.

15. The system of claim 12, wherein the instructions to cause the image-based task training operation to be performed on the first encoding portion module and the decoding portion module include instructions to cause, in a manner that causes weights associated with the multi-frame feature matching portion module to remain unchanged, the image-based task training operation to be performed on the first encoding portion module and the decoding portion module.

16. The system of claim 12, wherein the second training operation module further includes instructions that, when executed by the third processor, cause the third processor to cause, using the second training dataset, a second geometry-based task training operation to be performed on the multi-frame feature matching portion module.

17. The system of claim 16, wherein the second geometry-based task training operation is performed concurrently with the image-based task training operation.

18. A method, comprising:
encoding, by a processor operating an encoding portion of a neural network, an image to produce single-frame features;
processing, by the processor operating a multi-frame feature matching portion of the neural network, the single-frame features to produce information; and
decoding, by the processor operating a decoding portion of the neural network, the information to produce a depth map, wherein a first training dataset, used to train the multi-frame feature matching portion, is different from a second training dataset used to train the encoding portion and the decoding portion.

19. The method of claim 18, wherein the depth map comprises a set of depth maps, a scale of a first depth map, in the set of depth maps, being different from a scale of a second depth map in the set of depth maps.

20. A non-transitory computer-readable medium for producing a depth map, the non-transitory computer-readable medium including instructions that, when executed by one or more processors, cause the one or more processors to:
encode, operating an encoding portion of a neural network, an image to produce single-frame features;
process, operating a multi-frame feature matching portion of the neural network, the single-frame features to produce information; and
decode, operating a decoding portion of the neural network, the information to produce the depth map, wherein a first training dataset, used to train the multi-frame feature matching portion, is different from a second training dataset used to train the encoding portion and the decoding portion.

* * * * *